(12) United States Patent
Park et al.

(10) Patent No.: US 12,095,876 B2
(45) Date of Patent: Sep. 17, 2024

(54) ELECTRONIC APPARATUS AND METHOD FOR CONTROLLING THEREOF

(71) Applicant: Samsung Electronics Co., Ltd., Suwon-si (KR)

(72) Inventors: Jungho Park, Suwon-si (KR); Yul Kim, Suwon-si (KR); Sejeong Kwon, Suwon-si (KR); Soohyung Kim, Suwon-si (KR); Wonsuk Yang, Suwon-si (KR); Kyunghwan Lee, Suwon-si (KR); Junhyuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/300,066

(22) Filed: Apr. 13, 2023

(65) Prior Publication Data
US 2023/0247103 A1    Aug. 3, 2023

Related U.S. Application Data

(63) Continuation of application No. PCT/KR2022/015044, filed on Oct. 6, 2022.

(30) Foreign Application Priority Data

Oct. 7, 2021 (KR) .................. 10-2021-0133439

(51) Int. Cl.
*H04L 67/50* (2022.01)
*G06F 16/35* (2019.01)
(Continued)

(52) U.S. Cl.
CPC ............ *H04L 67/535* (2022.05); *G06F 16/35* (2019.01); *H04L 41/16* (2013.01); *H04L 43/04* (2013.01); *H04L 67/02* (2013.01)

(58) Field of Classification Search
None
See application file for complete search history.

(56) References Cited

U.S. PATENT DOCUMENTS 9,514,248 B1    12/2016  Guan et al.
10,581,980 B2    3/2020  Williams et al.
(Continued)

FOREIGN PATENT DOCUMENTS

KR    10-2011-0121241 A    11/2011
KR    10-2021-0058533 A    5/2021

OTHER PUBLICATIONS

Malloy et al., Internet Device Graphs, KDD 2017, Aug. 2017.
(Continued)

*Primary Examiner* — Lashonda Jacobs-Burton
(74) *Attorney, Agent, or Firm* — Jefferson IP Law, LLP

(57) ABSTRACT

An electronic apparatus is provided. The electronic apparatus includes a communication interface, a memory storing log data with respect to external devices connected to the electronic apparatus, and a processor configured to identify a plurality of external devices having a history of being connected to the same internet protocol (IP) based on the log data, acquire, based on the log data, a first feature vector with respect to a relationship between the plurality of external devices and a second feature vector with respect to each of the plurality of external devices, acquire a graph of the relationship between the plurality of external devices based on the first feature vector and the second feature vector, and define at least one group configured by the plurality of external devices based on the graph.

19 Claims, 8 Drawing Sheets

(51) Int. Cl.
    *H04L 41/16*     (2022.01)
    *H04L 43/04*     (2022.01)
    *H04L 67/02*     (2022.01)

(56) References Cited

U.S. PATENT DOCUMENTS

| | | | |
|---|---|---|---|
| 11,170,778 B2* | 11/2021 | Jun | G06N 5/02 |
| 11,563,639 B1* | 1/2023 | Mittal | H04L 41/145 |
| 11,874,885 B2* | 1/2024 | Jeong | G06N 5/022 |
| 2013/0124309 A1* | 5/2013 | Traasdahl | H04L 67/535 |
| | | | 705/14.49 |
| 2016/0098239 A1* | 4/2016 | Lee | H04N 21/485 |
| | | | 348/705 |
| 2016/0182657 A1 | 6/2016 | Mukherjee et al. | |
| 2017/0111226 A1* | 4/2017 | Zhou | H04L 67/535 |
| 2017/0142465 A1* | 5/2017 | Ray | H04N 21/25883 |
| 2017/0206276 A1* | 7/2017 | Gill | G06F 16/285 |
| 2017/0295032 A1* | 10/2017 | Shin | H04L 12/2814 |
| 2019/0246440 A1* | 8/2019 | Bae | H04W 8/005 |
| 2020/0226186 A1 | 7/2020 | Liodden et al. | |
| 2020/0228609 A1 | 7/2020 | Williams et al. | |
| 2020/0257486 A1* | 8/2020 | Kamiyama | H04W 4/026 |
| 2020/0294086 A1 | 9/2020 | Traasdahl et al. | |
| 2020/0320126 A1 | 10/2020 | Atlas et al. | |
| 2021/0344764 A1* | 11/2021 | Jo | H04L 67/535 |
| 2022/0230063 A1* | 7/2022 | Kwon | G10L 15/16 |
| 2022/0415325 A1* | 12/2022 | Lee | G10L 15/20 |
| 2023/0027247 A1* | 1/2023 | Fang | A61K 45/06 |
| 2023/0334332 A1* | 10/2023 | Wu | G06V 10/761 |

OTHER PUBLICATIONS

Dean, Systematic Assessment of the Impact of User Roles on Network Flow Patterns, Naval Postgraduate School, Monterey, CA, Sep. 1, 2017.

Chen et al., Rubik: A Hierarchical Architecture for Efficient Graph Neural Network Training, IEEE Transactions on Computer-Aided Design of Integrated Circuits and Systems, vol. 41, No. 4, Issued Apr. 2022, May 11, 2021.

Soliman et al., A Graph Neural Network Approach for Scalable and Dynamic IP Similarity in Enterprise Networks, 2020 IEEE 9th International Conference on Cloud Networking (CloudNet), Feb. 2, 2021.

International Search Report and written opinion dated Jan. 25, 2023 issued in International Application No. PCT/KR2022/015044.

* cited by examiner

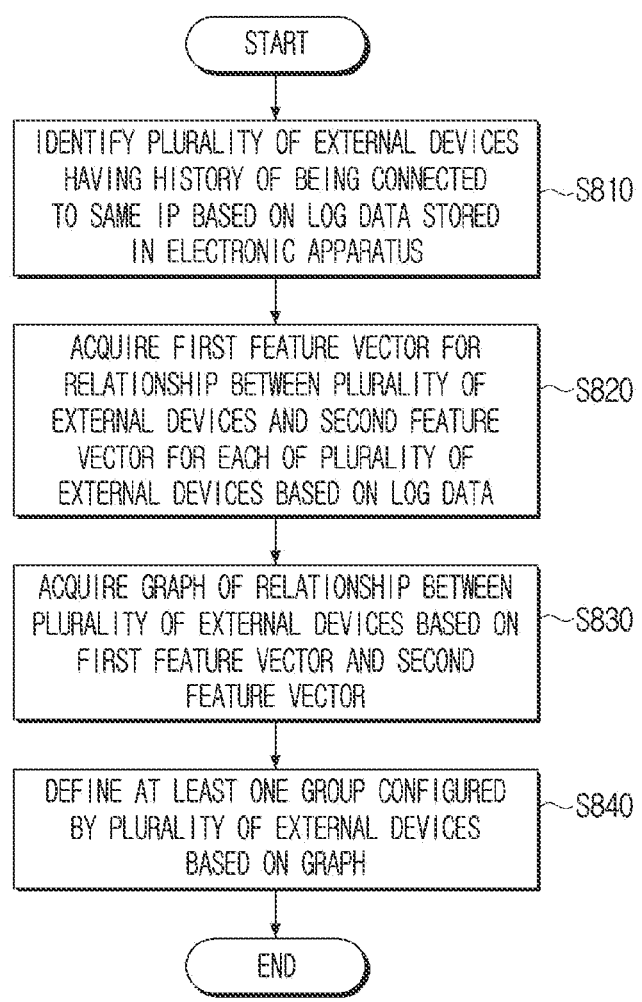

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2022/015044, filed on Oct. 6, 2022, which is based on and claims the benefit of a Korean patent application number 10-2021-0133439, filed on Oct. 7, 2021, in the Korean Intellectual Property Office, the disclosure of which is incorporated by reference herein in its entirety.

TECHNICAL FIELD

The disclosure relates to an electronic apparatus and a method for controlling thereof. More particularly, the disclosure relates to an electronic apparatus for clustering a plurality of external devices and a method for controlling thereof.

BACKGROUND ART

Clustering refers to grouping similar or related data. Recently, clustering has been used for various services. For example, it may be determined to which cluster a specific user belongs, and a service may be provided based on characteristics of the cluster.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Meanwhile, the conventional clustering method identifies a cluster based on a simple rule. For example, the conventional clustering method identifies a plurality of users (or user terminal) accessing the same internet protocol (IP) as the same cluster. Accordingly, there is problem in that an accuracy of a cluster is low, such as a user having a low relationship belongs to the same cluster, and cannot be used to provide various services.

Accordingly, there is a need for a technique for more accurate clustering.

Technical Solution

Aspects of the disclosure are to address at least the above-mentioned problems and/or disadvantages and to provide at least the advantages described below. Accordingly, one technical problem to be solved by the disclosure is to acquire information on a group constituted by a plurality of external devices, and to provide a service to a plurality of external devices based on the acquired information.

Technical problems of the disclosure are not limited to the technical problem described above, and other technical problems not described will be clearly understood by those skilled in the art from the following description.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface comprising circuitry, a memory for storing log data with respect to an external device connected to the electronic apparatus, and a processor, wherein the processor is configured to identify a plurality of external devices having a history of being connected to the same internet protocol (IP) based on the log data, acquire, based on the log data, a first feature vector with respect to a relationship between the plurality of external devices and a second feature vector with respect to each of the plurality of external devices, acquire a graph of the relationship between the plurality of external devices based on the first feature vector and the second feature vector, and define at least one group configured by the plurality of external devices based on the graph.

The log data may include a time at which the plurality of external devices are connected to the electronic apparatus, identification information of the plurality of external devices, and an IP address to which the plurality of external devices are connected, wherein the first feature vector is configured to include information on at least one of a similarity of an IP connection pattern of the plurality of external devices, a similarly of a type and usage pattern of the plurality of external devices, and wherein the second feature vector is configured to include information on at least one of the number of IP addresses to which the plurality of external devices are connected during a certain period, and types and usage patterns of the plurality of external devices.

The processor may acquire a first graph including identification information of the plurality of external devices and the first feature vector, acquire a second graph including a probability that two external devices among the plurality of external devices are included in the same group by inputting the first graph to a first neural network model, and define the at least one group based on the second graph.

The processor may define, based on a probability corresponding to a first edge constituting the second group being greater than a predetermined value, two external devices corresponding to two nodes directly connected to the first edge are in the same group, and define, based on a probability of corresponding to a second edge constituting the second graph is equal to or less than the predetermined value, two external devices corresponding to two nodes directly connected to the second edge are in different groups.

The processor may acquire identification information on a group to which each of the plurality of external devices belongs by applying a community detection algorithm to the second graph, and define a plurality of external devices having the same identification information of the group as one group.

The processor may acquire a third graph including deification information of the plurality of external devices and the second feature vector, identify a public device among the plurality of external devices by inputting the third graph into a second neural network model, and acquire a fourth graph by reconstructing the third graph based on the public device.

The processor may identify a node directly connected to a public node corresponding to the public device included in the third graph, separate the public node such that the number of public node is equal to the number of the identified node, and acquire the fourth graph by connecting the separated public node and the identified node.

The processor may acquire identification information of a sub-group to which each of the plurality of external devices belongs by applying the community detection algorithm to the fourth graph, and define a plurality of external devices having the same identification information of the sub-group as one sub-group.

The processor may control the communication interface to transmit correlated content to a plurality of external devices included in the at least one group.

The processor may receive information on the plurality of external devices from an external server through the communication interface, and the information on the plurality of external devices includes account information logged in through the plurality of external devices, and learn the first neural network model based on identification information on the plurality of external devices, the first feature vector, and information the plurality of external devices.

In accordance with an aspect of the disclosure, a method for controlling an electronic apparatus is provided. The method includes identifying a plurality of external devices having a history of being connected to the same internet protocol (IP) based on the log data stored in the electronic apparatus, acquiring, based on the log data, a first feature vector with respect to a relationship between the plurality of external devices and a second feature vector with respect to each of the plurality of external devices, acquiring a graph of the relationship between the plurality of external devices based on the first feature vector and the second feature vector, and defining at least one group configured by the plurality of external devices based on the graph.

The acquiring of the group may include acquiring a first graph including identification information of the plurality of external devices and the first feature vector, acquiring a second graph including a probability that two external devices among the plurality of external devices are included in the same group by inputting the first graph to a first neural network model, and wherein the defining the at least one group includes defining the at least one group based on the second graph.

The defining of the at least one group may include defining, based on a probability corresponding to a first edge constituting the second group being greater than a predetermined value, two external devices corresponding to two nodes directly connected to the first edge are in the same group, and defining, based on a probability of corresponding to a second edge constituting the second graph is equal to or less than the predetermined value, two external devices corresponding to two nodes directly connected to the second edge are in different groups.

The defining of the at least one group may include acquiring identification information on a group to which each of the plurality of external devices belongs by applying a community detection algorithm to the second graph, and defining a plurality of external devices having the same identification information of the group as one group.

The acquiring of the graph may include acquiring a third graph including deification information of the plurality of external devices and the second feature vector, identifying a public device among the plurality of external devices by inputting the third graph into a second neural network model, and acquiring a fourth graph by reconstructing the third graph based on the public device.

The acquiring of the graph may include identifying a node directly connected to a public node corresponding to the public device included in the third graph, separating the public node such that the number of public node is equal to the number of the identified node, and acquiring the fourth graph by connecting the separated public node and the identified node.

The defining of the at least one group may include acquiring identification information of a sub-group to which each of the plurality of external devices belongs by applying the community detection algorithm to the fourth graph, and defining a plurality of external devices having the same identification information of the sub-group as one sub-group.

The method may further include transmitting correlated content to a plurality of external devices included in the at least one group.

The method may further include receiving information on the plurality of external devices from an external server, and learning the first neural network model based on identification information on the plurality of external devices, the first feature vector, and information the plurality of external devices, and wherein the information on the plurality of external devices may include account information logged in through the plurality of external devices.

The solutions of the problem of the disclosure are not limited to the solutions described above, and solutions not described will be clearly understood by those skilled in the art to which the disclosure belongs from the disclosure and the accompanying drawings.

Effect of the Invention

According to various embodiments of the disclosure as described above, a cluster to which a plurality of external devices belongs may be accurately identified, and a service based thereon may be provided.

In addition, effects acquirable or predicted by embodiments of the disclosure are to be disclosed directly or implicitly in the detailed description of the embodiments of the disclosure. For example, various effects predicted according to embodiments of the disclosure will be disclosed in the detailed description to be described below.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 8 is a flowchart illustrating a control method of an electronic apparatus according to an embodiment of the disclosure.

Throughout the drawings, it should be noted that like reference numbers are used to depict the same or similar elements, features, and structures.

Figure 1:
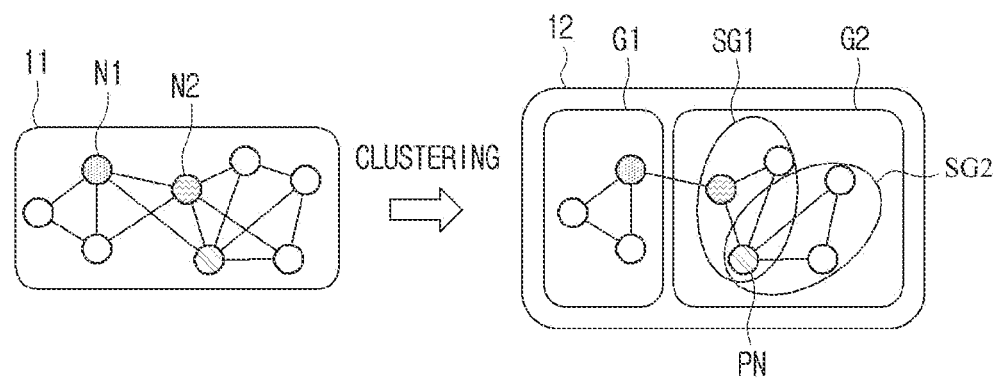
FIG. 1 is a view illustrating a concept of clustering according to an embodiment of the disclosure.

BEST MODE FOR IMPLEMENTING THE
DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The example embodiments may vary, and may be provided in different example embodiments. Various example embodiments will be described with reference to accompanying drawings. However, this does not necessarily limit the scope of the various embodiments to a specific embodiment form. Instead, modifications, equivalents and replacements included in the disclosed concept and technical scope of this specification may be employed. While describing various embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. In the application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The example embodiments of the disclosure will be described in greater detail below in a manner that will be understood by one of ordinary skill in the art. However, various embodiments may be realized in a variety of different configurations, and not limited to descriptions provided herein. Also, well-known functions or constructions are not described in detail since they would obscure the disclosure with unnecessary detail.

FIG. 1 is a view illustrating a concept of clustering according to an embodiment of the disclosure.

Referring to FIG. 1, an electronic apparatus 100 may acquire an initial graph 11. The initial graph 11 includes information on a relationship between the electronic apparatus 100 and a plurality of external devices connected thereto. A node of the initial graph 11 corresponds to an external device connected to the electronic apparatus 100, and an edge indicates a relationship between the external devices. Meanwhile, although the initial graph 11 is schematically presented in FIG. 1, the initial graph 11 may be presented as a vector. The initial graph 11 may be presented as a vector including identification information of an external device corresponding to each node and a value indicating whether a plurality of external devices are related. For example, the vector corresponding to the initial graph 11 may include an identification value ID1 of a first external device corresponding to a first node N1, an identification value ID2 of a second external device corresponding to a second node N2, and a value (e.g., 1) indicating that the first external device and the second external device are related.

The electronic apparatus 100 may generate the initial graph 11 based on log data recorded in log database. The log data may include a time when the external devices are connected to the electronic apparatus 100, identification information of the external devices, and an IP address to which the external devices are connected. The electronic apparatus 100 may generate the initial graph 11 by identifying external devices that have a history of being connected to the same IP address. For example, the electronic apparatus 100 may connect the first node N1 and the second node N2 respectively corresponding to the first external device and the second external device having a history connected to the same IP address.

Meanwhile, the conventional service system defines external devices corresponding to each node as the same group (or cluster) based on the number of nodes included in the initial graph 11. Specifically, when the number of nodes included in the initial graph 11 is smaller than a predetermined number, a service system defines external devices corresponding to each node as the same group. In addition, the service system provides content to the external device based on a group to which each external device belongs. For example, when providing content to the first external device and the second external device, the service system identifies that the two devices belong to the same group and provides correlated contents.

However, according to a conventional service system that defines a group based on a simple rule such as the number of nodes, external devices with low relationship may be defined as the same group in reality. For example, the first external device and the second external device may be terminals of users who have access to the same IP address but are not related at all. In this case, when content related to each other is provided to the first external device and the second external device, user inconvenience may occur.

To solve this problem, the electronic apparatus 100 may acquire a final graph 12 by performing clustering based on the initial graph 11. Some of nodes included in the initial graph 11 may be defined as different groups in the final graph 12. For example, the first external device may belong to a first group G1 and the second external device may belong to a second group G2. Accordingly, mutually related content may not be provided to the first external device and the second external device belonging to different groups.

In addition, the electronic apparatus 100 may define a plurality of sub-groups within one group. A first sub-group SG1 including some of the nodes included in the second group G2 and a second sub-group SG2 including the others may be defined. For example, the first group G1 and the second group G2 may correspond to a first family and a second family, respectively, and the first sub-group SG1 may correspond to a first user among the first family members, and the second sub-group SG2 may correspond to a second user among the second family members. In this case, the first sub-group SG1 and the second sub-group SG2 may include a public device (or a public external device) corresponding to a public node PN.

The electronic apparatus 100 may provide a service based on the final graph 12. For example, the electronic apparatus 100 may transmit mutually related content (e.g., advertisement content) to external devices included in the first sub-group SG1. Accordingly, satisfaction of a first user corresponding to the first sub-group SG1 may be improved. As such, the electronic apparatus 100 may provide a service based on cluster information with improved accuracy compared to the conventional service system, and thus the user's satisfaction and convenience may be improved.

Figure 2:
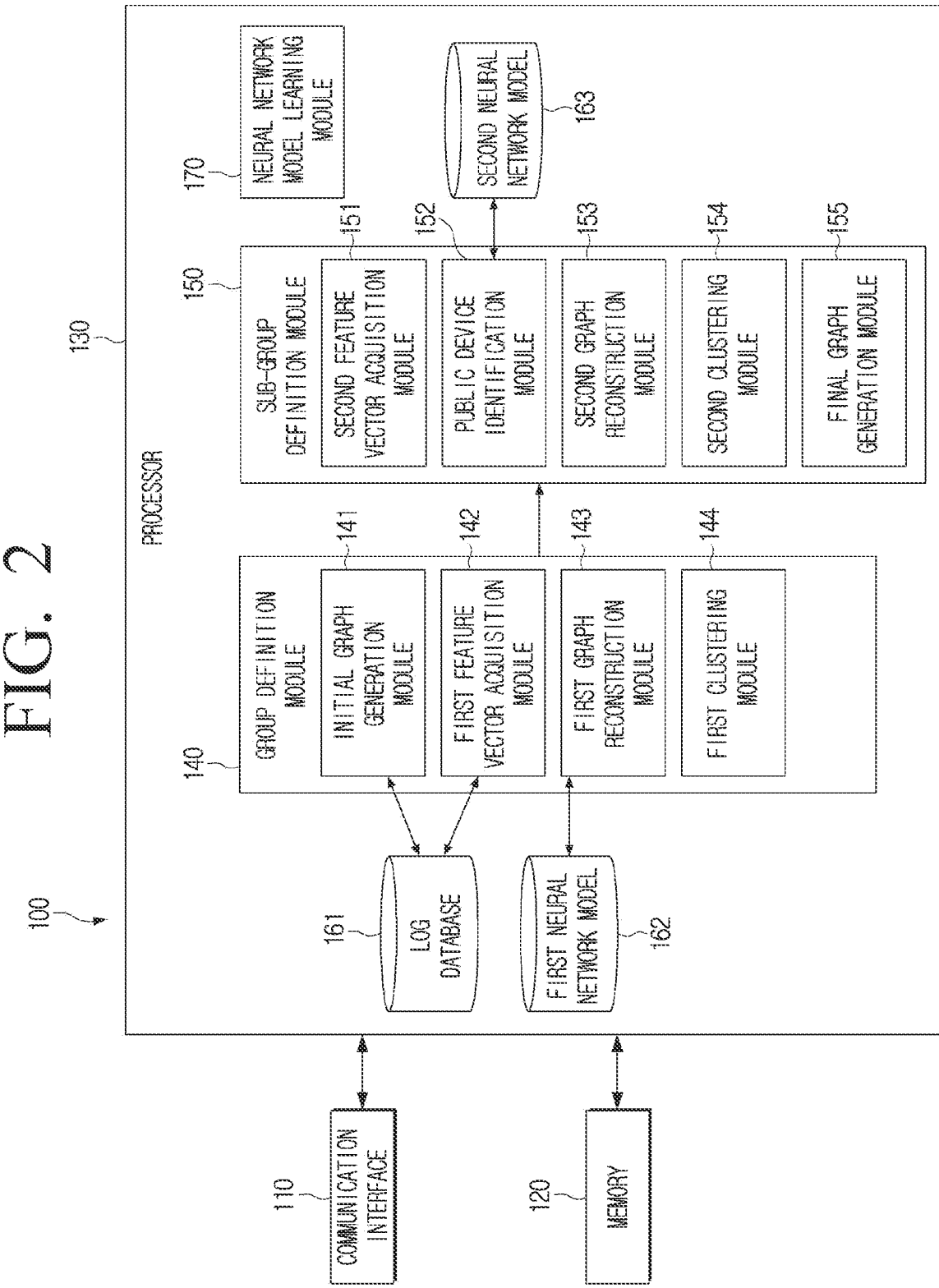
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a communication interface 110, a memory 120, and a processor 130. For example, the electronic apparatus 100 may be a server. However, this is only an embodiment, and the electronic apparatus 100 may be a user terminal. Meanwhile, the configuration of the electronic apparatus 100 is not limited to the configuration illustrated in FIG. 2, and configurations obvious to those skilled in the art may be added.

The communication interface 110 may communicate with various types of external devices according to various manners of communication. For example, the communication interface 110 may receive information on a plurality of external devices from an external server. The information on the plurality of external devices may include information on a group to which each of the plurality of external devices belongs, and information on whether a plurality of pairs of external devices belong to the same group. As another example, the communication interface 110 may transmit content to an external device. Meanwhile, the communication interface 110 may include at least one of a Wi-Fi module, a Bluetooth module, a ZigBee module, a Beacon module, a cellular communication module, a 3rd generation (3G) mobile communication module, a 4th generation (4G) mobile communication module, a 4G Long Term Evolution (LTE) communication module, and a 5th generation (5G) mobile communication module.

The memory 120 may store an operating system (OS) for controlling overall operations of the elements of the electronic apparatus 100 and commands or data related to the elements of the electronic apparatus 100. For example, the memory 120 may store log data of a plurality of external devices connected to the electronic apparatus 100. The memory 120 may store data necessary for the operation of the electronic apparatus 100.

A module for controlling the operation of the electronic apparatus 100 may include a group definition module 140, a sub-group definition module 150, and a neural network model learning module 170. The group definition module 140 may include an initial graph generation module 141, a first feature vector acquisition module 142, a first graph reconstruction module 143, and a first clustering module 144. The sub-group definition module 150 may include a second feature vector acquisition module 151, a public device identification module 152, a second graph reconstruction module 153, a second clustering module 154, and a final graph generation module 155.

The memory 120 may store a log database 161 in which log data of an external device connected to the electronic apparatus 100 is recorded. The log data of the external device may include a time when the external devices are connected to the electronic apparatus 100, identification information of the external devices, and an IP address to which the external device is connected.

The memory 120 may store a neural network model. The memory 120 may store a first neural network model 162 and a second neural network model 163. The first neural network model 162 may be a model learned to acquire a probability that two external devices among a plurality of external devices belong to the same group. The second neural network model 163 may be a model learned to predict a public device. The first neural network model 162 and the second neural network model 163 may include a graph neural network (GNN). Meanwhile, the memory 120 may be implemented as a non-volatile memory (e.g., a hard disk, a solid state drive (SSD), a flash memory), a volatile memory, or the like.

The processor 130 may be electrically connected to the memory 120 to control overall functions and operations of the electronic apparatus 100. The processor 130 may load data for performing various operations of modules 141 to 144 and 151 to 155 stored in the non-volatile memory into the volatile memory. Here, loading refers to an operation of loading and storing data stored in the non-volatile memory into the volatile memory such that the processor 130 can access it.

The group definition module 140 may define at least one group configured by a plurality of external devices connected to the electronic apparatus 100. For example, the group definition module 140 may define the first group G1 and the second group G2 of FIG. 1. Here, the first group G1 may correspond to the first family, and the second group G2 may correspond to the second family.

The initial graph generation module 141 may acquire an initial graph. The initial graph may include information on a relationship between the electronic apparatus 100 and a plurality of external devices connected thereto. For example, the initial graph may include information on whether two external devices among the plurality of external devices are related to each other. Like the initial graph 11 of FIG. 1, the initial graph may be presented as a vector including identification information of an external device corresponding to each node and a value indicating whether a plurality of external devices are related. Meanwhile, external devices related to each other among the plurality of external devices may form a pair. If the first external device and the second external device are related to each other, the first external device and the second external device make a pair.

The initial graph generation module 141 may generate an initial graph based on log data stored in the log database 161. For example, the initial graph generation module 141 may generate the initial graph 11 by identifying external devices connected to the same IP address among a plurality of external devices having a history of being connected to the electronic apparatus 100. The log data may include a time when the external devices are connected to the electronic apparatus 100, identification information of the external devices, and an IP address to which the external devices are connected.

The first feature vector acquisition module 142 may acquire information on two external devices forming a pair among the plurality of external devices based on log data stored in the log database 161. The first feature vector acquisition module 142 may analyze log data for each of the plurality of external devices to acquire information on a pair of external devices. The first feature vector acquisition module 142 may acquire a first feature vector (or feature value) of a relationship between two external devices forming a pair based on the information on an external device pair. The first feature vector may include information on the external device pair.

For example, the information on the pair of external devices may include at least one of a similarity of an IP connection pattern of two external devices forming a pair, a type, and a similarity of a usage pattern. The IP connection pattern of the pair of external devices may be related to at least one of the number of times the two external devices are connected to the same IP address for a certain period (e.g., one month) and the time the two external devices are connected to the same IP address. The type of the external device pair indicates a pair of each type of two external devices (e.g., television (TV)-smartphone). The usage pattern of the pair of external devices may be related to at least one of a usage time of the two external devices and content output from the two external devices. For example, a first column of the first feature vector may indicate a similarity of IP connection patterns of two paired external devices, a second column may indicate the types of two paired external devices, and a third column may indicate a similarity of usage patterns of two paired external devices.

The first graph reconstruction module 143 may reconstruct the initial graph based on the initial graph and the first feature vector. The first graph reconstruction module 143 may generate a first graph including identification information of a plurality of external devices corresponding to nodes included in the initial graph and a first feature vector. The first graph reconstruction module 143 may acquire a second graph including a probability that two external devices forming a pair are included in the same group by inputting the first graph into the first neural network model 162. The second graph may include identification information of an external device corresponding to each node and a probability that a pair of external devices corresponding to each edge belongs to the same group. For example, the second graph may include identification information of each of the first and second external devices forming a pair, and a probability that the first external device and the second external device belong to the same group.

Meanwhile, the first graph reconstruction module 143 may delete at least one edge included in the second graph based on a probability that the pair of external devices included in the second graph belongs to the same group. For example, the first graph reconstruction module 143 may identify a first edge corresponding to a probability lower than a predetermined value (e.g., 0.5) and remove the first edge. Accordingly, the first graph reconstruction module 143 may correct the second graph by removing a connection relationship between external devices with low relationship.

The first clustering module 144 may define at least one group configured by a plurality of external devices based on the second graph acquired by the first graph reconstruction module 143. For example, if a probability corresponding to the first edge included in the second graph is greater than a predetermined value, the first clustering module 144 may define that two external devices corresponding to two nodes directly connected to the first edge are in the same group. If a probability corresponding to the second edge constituting the second graph is less than or equal to a predetermined value, the first clustering module 144 may define that two external devices corresponding to two nodes directly connected to the second edge are in different groups.

The first clustering module 144 may apply the second graph to a community detection algorithm to define at least one group configured by a plurality of external devices. The community detection algorithm is an algorithm for outputting identification information on a group to which each of the plurality of external devices belongs. Specifically, the first clustering module 144 may acquire identification information on a group to which each of the plurality of external devices belongs by applying the second graph to the community detection algorithm. The first clustering module 144 may define external devices having the same group identification information as the same group. The first clustering module 144 may match identification information of each of the plurality of external devices with identification information of a group to which each of the plurality of external devices belongs, and store the matching information in the memory 120.

The sub-group definition module 150 may define a sub-group by subdividing the group defined by the group definition module 140 again. For example, if a group in a family unit is defined by the group definition module 140, the sub-group definition module 150 may define a sub-group in a family member unit.

The second feature vector acquisition module 151 may acquire a second feature vector corresponding to each of the plurality of external devices included in the group defined by the group definition module 140. In other words, the second feature vector may correspond to each node of the second graph acquired by the first graph reconstruction module 143. The second feature vector may include information on at least one of the number of IP addresses connected to an external device during a certain period (e.g., one month), a type of the external device (e.g., TV), and a usage pattern. The usage pattern of the external device may be related to a time (e.g., breakfast, lunch, dinner, etc.) in which the external device is used. For example, a first column of the second feature vector may indicate the number of IP addresses connected to the external device during one day, a second column may indicate the type of the external device, and a third column may indicate the usage pattern of the external device.

The public device identification module 152 may identify whether the plurality of external devices included in the group is a first type external device or a second type external device based on the second feature vector. The first type of external device may refer to a personal device, and the second type of external device may refer to a public device. The public device corresponds to a device used by two or more users. For example, the public device may include a TV used by a second user and a third user included in the second group.

The public device identification module 152 may identify a public device among a plurality of external devices included in the group based on the second feature vector. The public device identification module 152 may acquire a probability that the external device is a public device by inputting the identification information of the external device and the second feature vector into the second neural network model 163. When the probability that a specific external device is a public device is greater than a predetermined value (e.g., 0.6), the public device identification module 152 may identify the corresponding external device as a public device. For example, when the probability that the first external device is a public device is 0.7, the public device identification module 152 may identify the first external device as a public device.

The second graph reconstruction module 153 may acquire a third graph by reconstructing the second graph acquired by the first graph reconstruction module 143 based on the identified public device. The second graph reconstruction module 153 may identify the number of nodes directly connected to a node (hereinafter, referred to as a public node) corresponding to the public device. Here, that two nodes are directly connected signifies that the number of edges connected between the two nodes is one. The second graph reconstruction module 153 may additionally generate public nodes such that the number of public nodes is equal to the number of identified nodes.

For example, when a first public node is directly connected to the first node and the second node, the second graph reconstruction module 153 may additionally generate one first public node. Accordingly, a plurality of first public nodes including a 1-1 public node and 1-2 public node may exist. The second graph reconstruction module 153 may connect the plurality of first public nodes and adjacent nodes such that each of the plurality of first public nodes is directly connected to only one node. For example, the second graph reconstruction module 153 may connect the 1-1 public node to the first node, and connect the 1-2 public node to the second node. The second graph reconstruction module 153 may match identification information of a public device with identification information of an external device corresponding to a node directly connected to the public node and store the matching information in the memory 120.

The second clustering module 154 may define at least one sub-group configured by a plurality of external devices. For example, the second clustering module 154 may acquire identification information of a sub-group to which each of the plurality of external devices belong corresponding to each node of the third graph by inputting the third graph acquired by the second graph reconstruction module 153 to a community detection algorithm.

For example, the second clustering module 154 may acquire identification information SGID1 of the first sub-group to which the first external device belongs. The second clustering module 154 may define external devices having the same sub-group identification information as one sub-group. For example, when the identification information of the sub-group corresponding to the first external device and the second external device is the same, the second clustering module 154 may define the first external device and the second external device as the same sub-group. The second clustering module 154 may match the identification information of a plurality of external devices constituting the sub-group with the identification information of the sub-group to store the matching information in the memory 120.

The final graph generation module 155 may generate a final graph based on the public node and a fourth graph acquired by the second graph reconstruction module 153. The final graph generation module 155 may merge a plurality of public nodes included in a new graph acquired by the second clustering module 154 into one. For example, when the 1-1 public node is directly connected to the first node and the 1-2 public node is directly connected to the second node, the final graph generation module 155 may merge the 1-1 public node and the 1-2 public node into the first public node. Accordingly, the first public node may be directly connected to the first node and the second node.

Meanwhile, in FIG. 2, it has been described that the sub-group definition module 150 reconstructs a graph centering on the public device, but this is only an example, and the sub-group definition module 150 may reconstruct the graph based on the other types of devices.

The neural network model learning module 170 may learn the first neural network model 162 based on the first learning data. The first learning data may include an initial graph, a first feature vector, and information on a plurality of external devices. The information on the plurality of external devices may include accounts logged in through each of the plurality of external devices or email addresses. In addition, the information on the plurality of external devices may include information on whether a plurality of users of the plurality of external devices belong to the same group. For example, the information on the plurality of external devices may include information on whether the first user of the first external device and the second user of the second external device are actually family members. Meanwhile, information on the plurality of external devices may be received from an external server and stored in the memory 120.

The neural network model learning module 170 may learn the second neural network model 163 based on second learning data. The second learning data may include identification information of a plurality of external devices, and information on a second feature vector and a plurality of external devices. The information on the plurality of external devices may include information on whether the plurality of external devices are public devices.

Meanwhile, functions related to artificial intelligence according to the disclosure may be operated through the processor 130 and the memory 120. The processor 130 may include one or more processors. In this case, the one or more processors may be a general-purpose processor such as a central processing unit (CPU), an application processor (AP), a digital signal processor (DSP), or the like, a graphics-only processor such as a graphics processing unit (GPU), a vision processing unit (VPU), or an artificial intelligence-only processor such as an neural processing unit (NPU). One or more processors control to process input data according to a predefined operation rule or artificial intelligence model stored in the memory 120. Alternatively, when one or more processors are artificial intelligence (AI)-only processors, the AI-only processor may be designed with a hardware structure specialized for processing a specific AI model.

The predefined operation rule or artificial intelligence model is characterized in that it is generated through learning. Here, being generated through learning means that a basic artificial intelligence model is learned using a plurality of learning data by a learning algorithm, such that a predefined operation rule or artificial intelligence model set to perform a desired characteristic (or purpose) is generated means burden. Such learning may be performed in a device itself on which artificial intelligence according to the disclosure is performed, or may be performed through a separate server and/or system. Examples of the learning algorithm include, but are not limited to, supervised learning, unsupervised learning, semi-supervised learning, or reinforcement learning.

The AI model may be generated through learning. Here, being made through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weight values. The plurality of weight values of the plurality of neural network layers may be optimized by a learning result of the artificial intelligence model. For example, a plurality of weight values may be updated such that a loss value or a cost value acquired from the artificial intelligence model during the learning process is reduced or minimized.

The AI model may be processed by an AI-only processor designed with a hardware structure specialized for processing the AI model. The AI model may be generated through learning. Here, being generated through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weights values.

The artificial neural network may include a deep neural network (DNN), for example, a convolutional neural network (CNN), a deep neural network (DNN), a recurrent neural network (RNN), a generative adversarial network (GAN), restricted Boltzmann machine (RBM), deep belief network (DBN), bidirectional recurrent deep neural network (BRDNN), or deep Q-networks, but is not limited to the examples described above.

Figure 3:
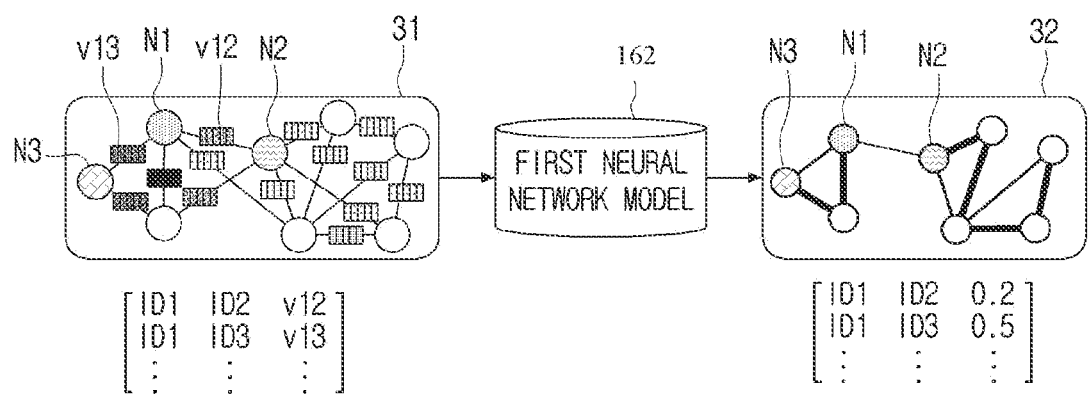
FIG. 3 is a view illustrating a second graph acquisition method according to an embodiment of the disclosure.

FIG. 3 is a view illustrating a second graph acquisition method according to an embodiment of the disclosure of the disclosure.

Referring to FIG. 3, the electronic apparatus 100 may acquire identification information (ID1, ID2, ID3, . . . , IDn) and a first graph 31 including a first feature vector (v12, v13, . . . , vnm). For example, the first feature vector v12 may include information on a relationship between a first external device corresponding to the first node N1 and a second external device corresponding to the second node N2.

The electronic apparatus 100 may acquire the first graph 31 based on log data recorded in the log database 161. As illustrated in FIG. 3, the first graph 31 may be presented as a vector including identification information ID1, ID2, ID3, . . . , IDn, and first feature vectors v12, v13, . . . , vnm.

The electronic apparatus 100 may acquire a second graph 32 by inputting the first graph 31 into the first neural network model 162. The second graph 32 may include a probability that two external devices corresponding to two nodes connected to each other are included in the same group. For example, a probability that the first external device and the second external device are included in the same group may be 0.2, and a probability that the first external device and the third external device are included in the same group may be 0.5. As illustrated in FIG. 3, the second graph 32 may be presented as identification information ID1, ID2, ID3, . . . , IDn, and a vector including a probability (0.2, 0.5, . . . , n) of two external devices being included in the same group.

In the second graph 32, that is, the reconstructed graph, a thickness of an edge indicates a probability that two external devices are included in the same group. Specifically, the greater the probability that the two external devices are included in the same group, the thicker the edge between the two nodes corresponding to the two external devices is presented.

The electronic apparatus 100 may correct the reconstructed graph based on a probability included in the second graph 32. For example, when the probability that the first external device corresponding to the first node N1 and the second external device corresponding to the second node N2 are included in the same group is lower than a predetermined value (e.g., 0.4), the electronic apparatus 100 may remove an edge between the first node N1 and the second node N2.

Figure 4:
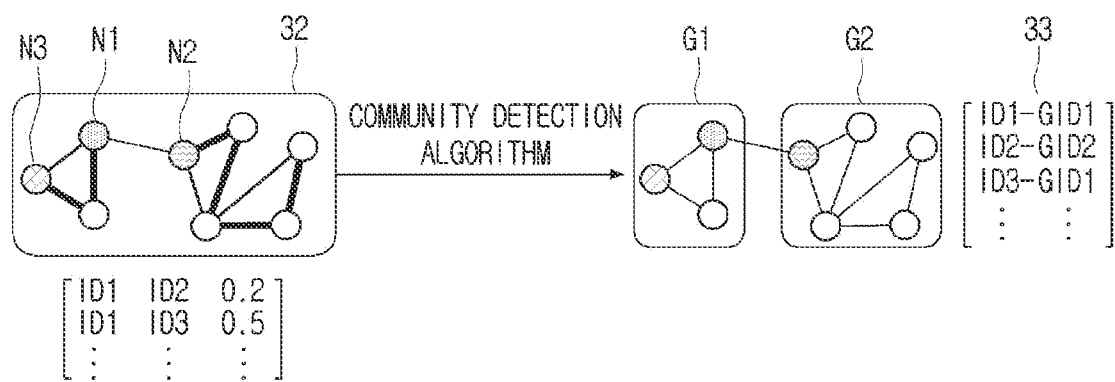
FIG. 4 is a view illustrating a group definition method according to an embodiment of the disclosure.

FIG. 4 is a view illustrating a group definition method according to an embodiment of the disclosure of the disclosure.

Referring to FIG. 4, the electronic apparatus 100 may acquire group identification information 33 of a group to which each of a plurality of external devices belongs by applying the second graph 32 to a community detection algorithm. For example, the electronic apparatus 100 may acquire identification information GID1 for the first group G1 to which the first node N1 belongs, and identification information GID2 for the second group G2 to which the second node N2 belongs, identification information GID1 for the first group G1 to which the third node N3 belongs. The electronic apparatus 100 may define at least one group configured by a plurality of external devices based on the group identification information 33. For example, the electronic apparatus 100 may define a first external device corresponding to the first node N1 and a third external device corresponding to the third node N3 as the first group G1, and define a second external device corresponding to the second node N2 as the second group G2.

Figure 5:
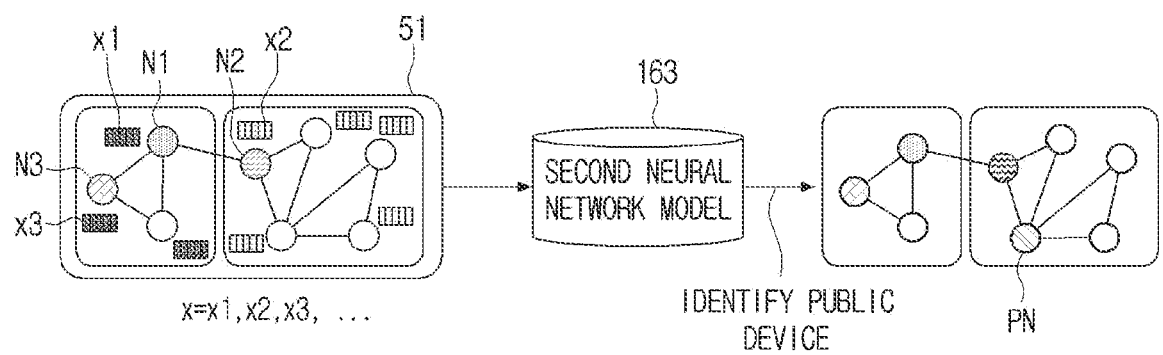
FIG. 5 is a view illustrating a method for identifying a public device according to an embodiment of the disclosure.

FIG. 5 is a view illustrating a method for identifying a public device according to an embodiment of the disclosure.

Referring to FIG. 5, the electronic apparatus 100 may acquire a second feature vector (x=x1, x2, x3, . . . xn) corresponding to nodes N1, N2, N3, . . . Nn of the second graph 32 of FIG. 4. The electronic apparatus 100 may acquire a second feature vector x based on log data stored in the log database 161. The electronic apparatus 100 may acquire a third graph 51 including the second feature vector x of the identification information of the external device corresponding to a node of the second graph 32. The electronic apparatus 100 may acquire a probability that the external device is a public device by inputting the third graph 51 into the second neural network model 163. If the acquired probability is greater than a predetermined value, the electronic apparatus 100 may identify the external device as a public device. The public node PN of FIG. 5 may correspond to the public device.

Figure 6:
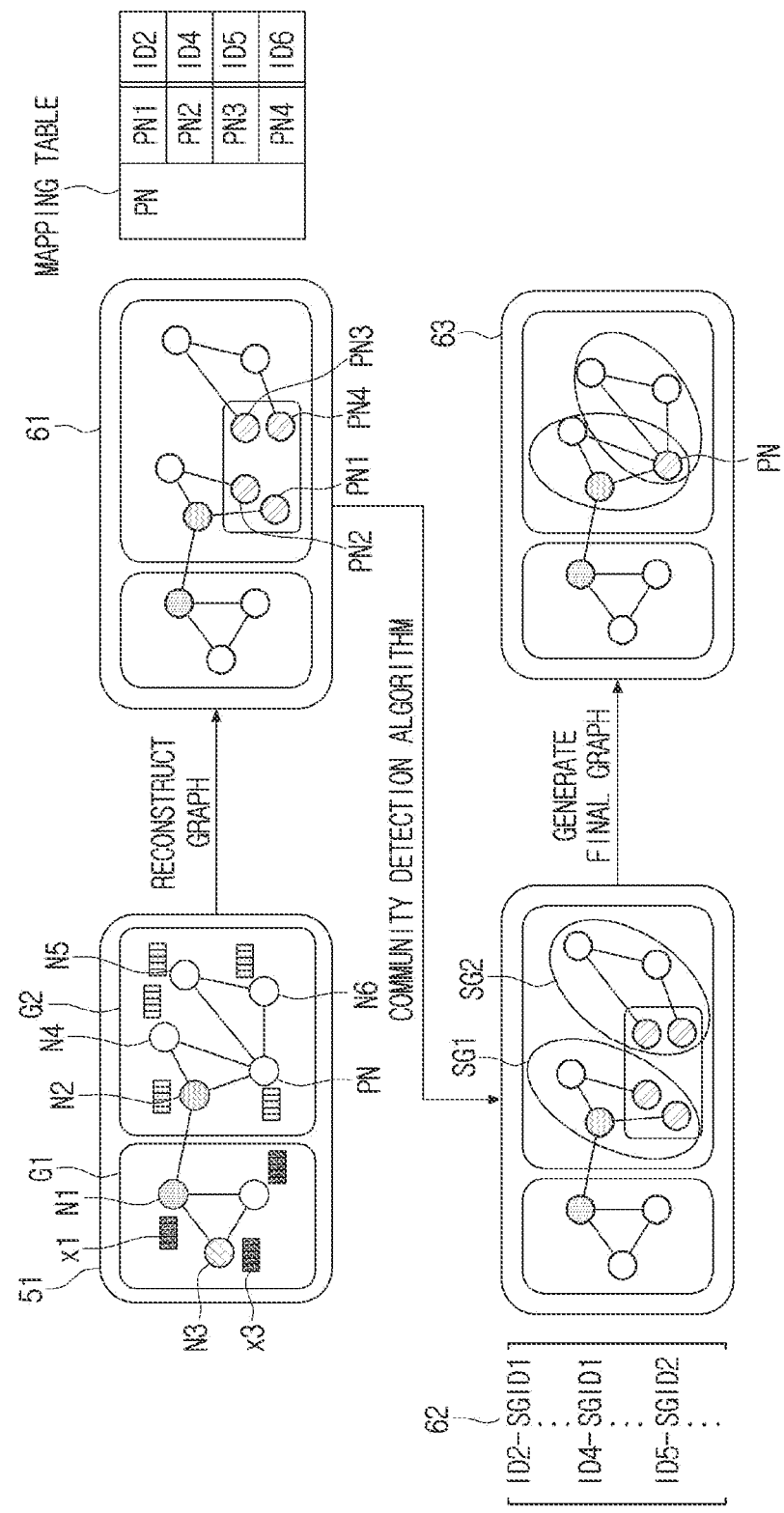
FIG. 6 is a view illustrating a method for defining a sub-group according to an embodiment of the disclosure.

FIG. 6 is a view illustrating a method for defining a sub-group according to an embodiment of the disclosure.

Referring to FIG. 6, the electronic apparatus 100 may acquire a fourth graph 61 by reconstructing the third graph 51. The electronic apparatus 100 may identify nodes N2, N4, N5, and N6 directly connected to the public node PN. The electronic apparatus 100 may generate public nodes PN such that the number of the public nodes PN is equal to the number of the identified nodes N2, N4, N5, and N6. For example, the electronic apparatus 100 may generate a first public node PN1, a second public node PN2, a third public node PN3, and a fourth public node PN4.

The electronic apparatus 100 may connect the generated public nodes PN1, PN2, PN3, and PN4 to the identified nodes N2, N4, N5, and N6 one-to-one. As illustrated in FIG. 6, the electronic apparatus 100 may connect the first public node PN1 and a second node N2, and connect the second public node PN2 and a fourth node N4, connect the third public node PN3 and a fifth node N5, and connect the fourth public node PN4 to a sixth node N6. In other words, the electronic apparatus 100 may reconstruct the graph by dividing the public node PN by the number of directly connected nodes.

The electronic apparatus 100 may acquire mapping table including identification information corresponding to the generated first to fourth public nodes PN1, PN2, PN3, and PN4, and the nodes N2, N4, N5, and N6 to store them in the memory 120. Meanwhile, the electronic apparatus 100 may replace identification information corresponding to the public node PN with identification information corresponding to the first to fourth public nodes PN1, PN2, PN3, and PN4.

The electronic apparatus 100 may acquire sub-group identification information 62 of the fourth graph 61 of a sub-group to which each of a plurality of external devices corresponding to a plurality of nodes of the fourth graph 61 belongs by applying the fourth graph 61 to the community detection algorithm. For example, the electronic apparatus 100 may acquire identification information SGID1 for the first group SG1 to which the second node N2 and the fourth node N4 belong, and identification information SGID2 for the sub-second group SG2 to which the fifth node N5 belongs.

The electronic apparatus 100 may define at least one sub-group configured by a plurality of external devices based on sub-group identification information 62. For example, the electronic apparatus 100 may define a second external device corresponding to the second node N2 and a fourth external device corresponding to the fourth node N4 as the first sub-group SG1, and define a fifth external device corresponding to the fifth node N5 as the second sub-group SG2.

The electronic apparatus 100 may acquire a final graph 63 based on the fourth graph 61. The electronic apparatus 100 may merge the public nodes PN1, PN2, PN3, and PN4 into one public node PN by using the mapping table. For example, identification information corresponding to the first to fourth public nodes PN1, PN2, PN3, and PN4 may be replaced with identification information corresponding to the public node PN.

The electronic apparatus 100 may provide a service to a plurality of external devices based on the final graph 63. For example, the electronic apparatus 100 may transmit content related to each other to a plurality of external devices included in the first sub-group SG1. Alternatively, the electronic apparatus 100 may acquire information (e.g., a search keyword) input by the user to the first external device included in the first sub-group SG1 and store it in the memory 120. Also, when a predetermined event related to the second external device included in the first sub-group SG1 occurs, the electronic apparatus 100 may transmit information related to the search keyword (e.g., advertisement for products related to your search keywords) to the second external device. Here, the predetermined event may include an event in which the second external device is activated.

Figure 7:
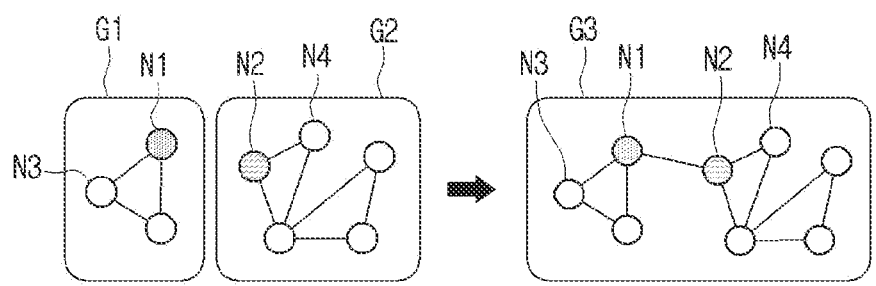
FIG. 7 is a view illustrating a group definition method according to an embodiment of the disclosure.

FIG. 7 is a view illustrating a group definition method according to an embodiment of the disclosure.

Referring to FIG. 7, the electronic apparatus 100 may merge a plurality of groups G1 and G2 into one group (e.g., third group G3). The electronic apparatus 100 may merge the groups based on a similarity of the second feature vector corresponding to the node included in each group. For example, the electronic apparatus 100 may identify a 2-1 feature vector corresponding to the first node N1 included in the first group G1 and a 2-2 second feature vector corresponding to the second node N2 included in the second group G2. When the similarity is greater than a predetermined value, the electronic apparatus 100 may define the third group G3 in which the first group G1 and the second group G2 are merged by connecting the first node N1 and the second node N2.

Meanwhile, even if the second feature vector corresponding to the two nodes are not similar, if the second feature vector corresponding to the other nodes connected to the two nodes are similar, the electronic apparatus 100 may connect the two nodes to merge the groups. For example, a similarity between the 2-1 feature vector corresponding to the first node N1 and the 2-2 feature vector corresponding to the second node N2 may be smaller than a predetermined value. Also, a similarity between a 2-3 feature vector corresponding to the third node N3 connected to the first node N1 and a 2-4 vector of the fourth node N4 connected to the second node N2 may be greater than the predetermined value. In this case, the electronic apparatus 100 may define the third group G3 by connecting the first node N1 and the second node N2.

FIG. 8 is a flowchart illustrating a control method of an electronic apparatus according to an embodiment of the disclosure.

Referring to FIG. 8, the electronic apparatus 100 may identify a plurality of external devices having a history of being connected to the same IP based on log data stored in the electronic apparatus 100, at operation S810. The log data may include time when the plurality of external devices are connected to the electronic apparatus 100, identification information of the plurality of external devices, and IP addresses to which the plurality of external devices are connected.

The electronic apparatus 100 may acquire a first feature vector for a relationship between a plurality of external devices and a second feature vector for each of the plurality of external devices based on the log data, at operation S820. The first feature vector may include information on at least one of similarity of IP connection patterns of the plurality of external devices, and similarities of types and usage patterns. The second feature vector may include information on at least one of the number of IP addresses connected to the plurality of external devices during a predetermined period, types and usage patterns of the plurality of external devices.

The electronic apparatus 100 may acquire a graph of a relationship between the plurality of external devices based on the first feature vector and the second feature vector, at operation S830, and define at least one group configured by the plurality of external devices based on the graph, at operation S840. For example, the electronic apparatus 100 may acquire a first graph including identification information of the plurality of external devices and the first feature vector, and input the first graph to the first neural network model to acquire a second graph including a probability that two external devices among the plurality of external devices are included in the same group.

The electronic apparatus 100 may define at least one group based on the second graph. For example, if a probability corresponding to a first edge constituting the second graph is greater than a predetermined value, the electronic apparatus 100 may define that two external devices corresponding to two nodes directly connected to the first edge are in the same group. If a probability corresponding to a second edge constituting the second graph is less than or equal to the predetermined value, the electronic apparatus 100 may define that two external devices corresponding to two nodes directly connected to the second edge are in different groups.

The electronic apparatus 100 may acquire identification information of a group to which each of the plurality of external devices belongs by applying a community detection algorithm to the second graph. The electronic apparatus 100 may define a plurality of external devices having the same group identification information as one group.

The electronic apparatus 100 may acquire a third graph including identification information of a plurality of external devices and a second feature vector. The electronic apparatus 100 may identify a public device among a plurality of external devices by inputting the third graph into the second neural network model. The electronic apparatus 100 may acquire a fourth graph by reconstructing the third graph based on the public device. For example, the electronic apparatus 100 may identify a node directly connected to a public node corresponding to the public device. The electronic apparatus 100 may separate the public node such that the number of public nodes is equal to the number of identified nodes. The electronic apparatus 100 may acquire the fourth graph by connecting the separated public node and the identified node.

The electronic apparatus 100 may acquire identification information of a sub-group to which each of the plurality of external devices belongs by applying the community detection algorithm to the fourth graph. The electronic apparatus 100 may define a plurality of external devices having the same sub-group identification information as one sub-group.

Various embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the disclosure.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the non-transitory computer-readable medium may be compact disc (CD), digital versatile disc (DVD), a hard disc, Blu-ray disc, universal serial bus (USB), a memory card, read-only memory (ROM), or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communication interface comprising at least one circuitry;
   a memory storing log data with respect to external devices connected to the electronic apparatus; and
   a processor configured to:
      based on the log data, identify a plurality of external devices having a history of being connected to a same internet protocol (IP),
      based on the log data and the plurality of external devices identified, acquire a first feature vector with respect to a relationship between the plurality of external devices and a second feature vector with respect to each of the plurality of external devices,
      based on the first feature vector and the second feature vector, acquire a graph of the relationship between the plurality of external devices, and
      based on the graph, define at least one group configured by the plurality of external devices.

2. The electronic apparatus of claim 1,
   wherein the log data comprises information regarding a time at which the plurality of external devices are connected to the electronic apparatus, identification information of the plurality of external devices, and an IP address to which the plurality of external devices are connected,
   wherein the first feature vector comprises information on at least one of a similarity of an IP connection pattern of the plurality of external devices or a similarly of a type and usage pattern of the plurality of external devices, and
   wherein the second feature vector comprises information on at least one of a number of IP addresses to which the plurality of external devices are connected during a certain period or types and usage patterns of the plurality of external devices.

3. The electronic apparatus of claim 1, wherein the processor is further configured to:
   acquire a first graph including identification information of the plurality of external devices and the first feature vector,
   based on inputting the first graph to a first neural network model, acquire a second graph including a probability that two external devices among the plurality of external devices are included in a same group, and
   based on the second graph, define the at least one group based on the second graph.

4. The electronic apparatus of claim 3, wherein the processor is further configured to:
   based on a probability corresponding to a first edge constituting a second group being greater than a predetermined value, define two external devices corresponding to two nodes directly connected to the first edge as being in the same group, and
   based on a probability corresponding to a second edge constituting the second graph being equal to or less than the predetermined value, define two external devices corresponding to two nodes directly connected to the second edge as being in different groups.

5. The electronic apparatus of claim 4, wherein the processor is further configured to:
   acquire identification information on a group to which each of the plurality of external devices belongs by applying a community detection algorithm to the second graph, and
   define the plurality of external devices having a same identification information of the group as being in one group.

6. The electronic apparatus of claim 1, wherein the processor is further configured to:

acquire a third graph including identification information of the plurality of external devices and the second feature vector, identify a public device among the plurality of external devices by inputting the third graph into a second neural network model, and acquire a fourth graph by reconstructing the third graph based on the public device.

7. The electronic apparatus of claim 6, wherein the processor is further configured to:

identify a node directly connected to a public node corresponding to the public device included in the third graph, separate the public node such that a number of the public node is equal to a number of the identified node, and acquire the fourth graph by connecting the separated public node and the identified node.

8. The electronic apparatus of claim 7, wherein the processor is further configured to:

acquire identification information of a sub-group to which each of the plurality of external devices belongs by applying a community detection algorithm to the fourth graph, and define the plurality of external devices having a same identification information of the sub-group as being in one sub-group.

9. The electronic apparatus of claim 1, wherein the processor is further configured to control the communication interface to transmit correlated content to the plurality of external devices included in the at least one group.

10. The electronic apparatus of claim 3, wherein the processor is further configured to:

receive, from an external server through the communication interface, information on the plurality of external devices comprising account information logged in through the plurality of external devices, and learn the first neural network model based on identification information on the plurality of external devices, the first feature vector, and the information on the plurality of external devices.

11. A method for controlling an electronic apparatus, the method comprising:

based on log data stored in the electronic apparatus, identifying a plurality of external devices having a history of being connected to a same internet protocol (IP), the log data being stored with respect to external devices connected to the electronic apparatus;

based on the log data and the plurality of external devices identified, acquiring a first feature vector with respect to a relationship between the plurality of external devices and a second feature vector with respect to each of the plurality of external devices;

based on the first feature vector and the second feature vector, acquiring a graph of the relationship between the plurality of external devices; and based on the graph, defining at least one group configured by the plurality of external devices.

12. The method of claim 11, wherein the log data comprises a time at which the plurality of external devices are connected to the electronic apparatus, identification information of the plurality of external devices, and an IP address to which the plurality of external devices are connected, wherein the first feature vector comprises information on at least one of a similarity of an IP connection pattern of the plurality of external devices or a similarly of a type and usage pattern of the plurality of external devices, and wherein the second feature vector comprises information on at least one of a number of IP addresses to which the plurality of external devices are connected during a certain period or types and usage patterns of the plurality of external devices.

13. The method of claim 11, wherein the acquiring of the group comprises:

acquiring a first graph including identification information of the plurality of external devices and the first feature vector; and based on inputting the first graph to a first neural network model, acquiring a second graph including a probability that two external devices among the plurality of external devices are included in a same group, and wherein the defining of the at least one group comprises defining the at least one group based on the second graph.

14. The method of claim 13, wherein the defining of the at least one group further comprises:

based on a probability corresponding to a first edge constituting a second group being greater than a predetermined value, defining two external devices corresponding to two nodes directly connected to the first edge as being in the same group; and based on a probability corresponding to a second edge constituting the second graph being equal to or less than the predetermined value, defining two external devices corresponding to two nodes directly connected to the second edge as being in different groups.

15. The method of claim 14, wherein the defining of the at least one group comprises:

acquiring identification information on a group to which each of the plurality of external devices belongs by applying a community detection algorithm to the second graph; and defining the plurality of external devices having a same identification information of the group as being in one group.

16. The method of claim 11, wherein the graph is presented as a vector including identification information of each of the plurality of external devices and a value indicating whether the plurality of external devices are related, and wherein external devices related to each other among the plurality of external devices form a pair.

17. The method of claim 11, wherein a thickness of an edge between two nodes of the graph indicates a probability that two external devices among the plurality of external devices are included in a same group, and wherein, as the probability that the two external devices are included in the same group increases, the thickness of the edge between the two nodes corresponding to the two external devices increases.

18. The method of claim 17, further comprising:

based on the probability that the two external devices are included in the same group is lower than a predetermined value, removing the edge between the two nodes.

19. The method of claim 12, wherein the usage pattern of the plurality of external devices is related to a time of day in which an external device is used.

* * * * *